United States Patent

Titz et al.

[11] Patent Number: 4,504,210
[45] Date of Patent: Mar. 12, 1985

[54] DIE FOR EXTRUDER

[75] Inventors: Siegfried Titz, Hennef; Matthias Langel, Troisdorf-Spich; Waldemar Wissinger, Siegburg; Josef Kurth, Troisdorf, all of Fed. Rep. of Germany

[73] Assignee: Dynamit Nobel Aktiengesellschaft, Troisdorf, Fed. Rep. of Germany

[21] Appl. No.: 492,254

[22] Filed: May 6, 1983

[30] Foreign Application Priority Data

May 6, 1982 [DE] Fed. Rep. of Germany ....... 3216918

[51] Int. Cl.³ .................................................. B29F 3/04
[52] U.S. Cl. .................................. 425/461; 264/177 R; 264/209.8; 425/467
[58] Field of Search ............... 425/461, 380, 467; 264/173, 209.8, 177 R, 568, 209.4

[56] References Cited

U.S. PATENT DOCUMENTS

| | | | |
|---|---|---|---|
| 3,103,037 | 9/1963 | Bennett et al. | 425/467 |
| 3,267,518 | 8/1966 | Juel et al. | 425/467 |
| 3,784,345 | 1/1974 | Wissinger et al. | 425/380 |
| 4,015,925 | 4/1977 | Heilmayr | 425/461 |
| 4,017,240 | 4/1977 | Nelson | 425/461 |
| 4,021,172 | 5/1977 | Prinz | 425/380 |
| 4,045,154 | 8/1977 | Ratheiser | 425/467 |
| 4,120,926 | 10/1978 | Titz | 264/568 |
| 4,268,239 | 5/1981 | Herrington, Jr. | 425/380 |
| 4,296,062 | 10/1981 | Gauchel et al. | 264/177 R |
| 4,321,228 | 3/1982 | de Kok | 264/209.8 |
| 4,383,812 | 5/1983 | Calcagni | 425/467 |

FOREIGN PATENT DOCUMENTS

| | | | |
|---|---|---|---|
| 45-34273 | 11/1970 | Japan | 425/467 |
| 433035 | 11/1974 | U.S.S.R. | 425/467 |

*Primary Examiner*—Jeffery Thurlow
*Attorney, Agent, or Firm*—Antonelli, Terry & Wands

[57] ABSTRACT

A die, associated with an extruder and provided with an inwrought flow channel with displacement cores for shaping a plasticized synthetic resin bulk stream into a profile cross-section with hollow chambers, has a die housing that is composed of several die members with vertical and/or horizontal mold joints. The displacement cores in the flow channel are connected to the die housing by core-holding webs that separate the flow channel by distances corresponding to the thicknesses of the webs, thus subdividing the bulk stream into separate partial streams, the cross-section of the combined partial streams being equal to the cross-section of the bulk stream, and the displacement cores being enlarged by the thickness of the core-holding webs so that the partial streams, with the flow cross-sections remaining the same, are conducted along the core-holding webs.

8 Claims, 27 Drawing Figures

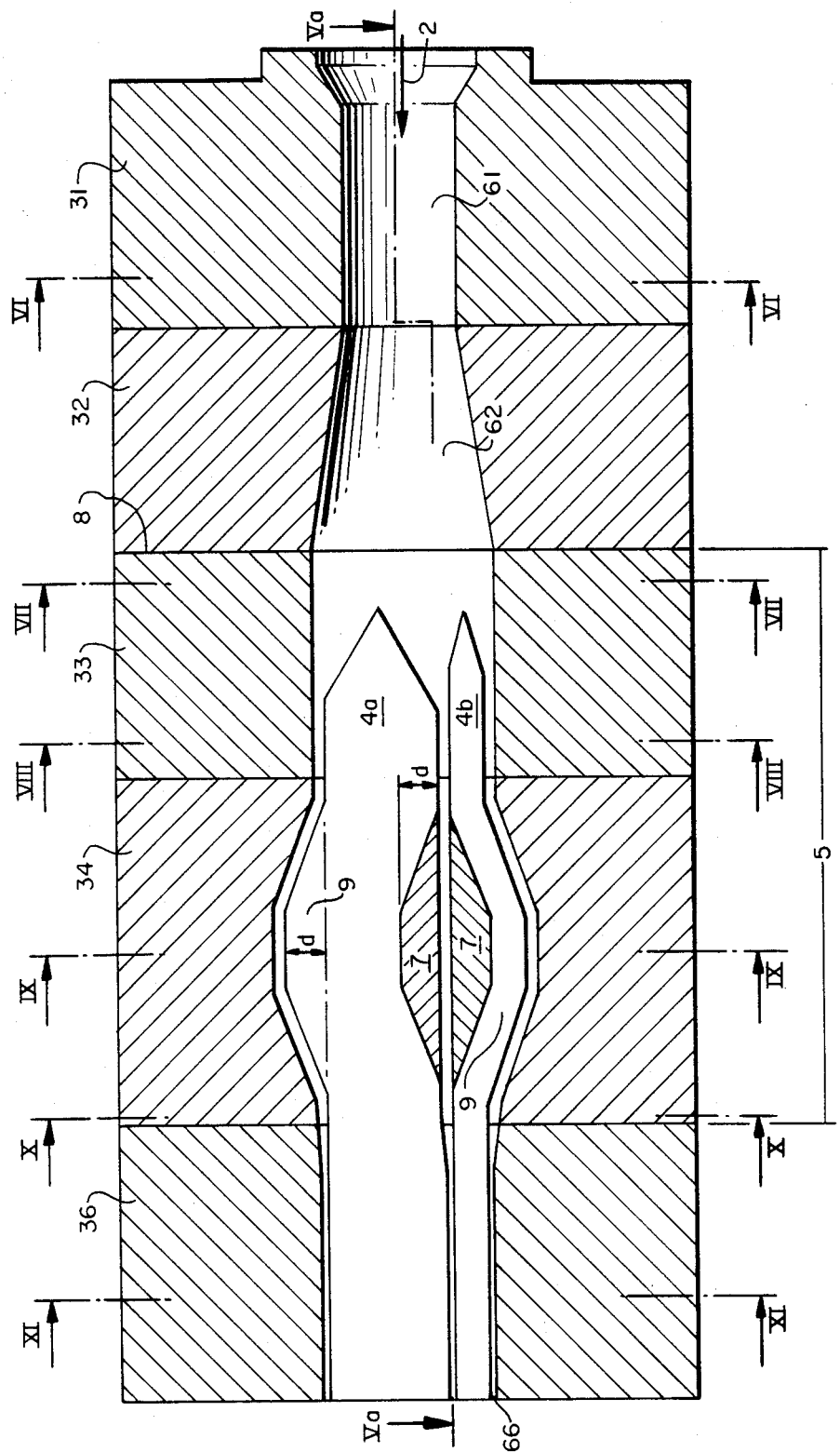

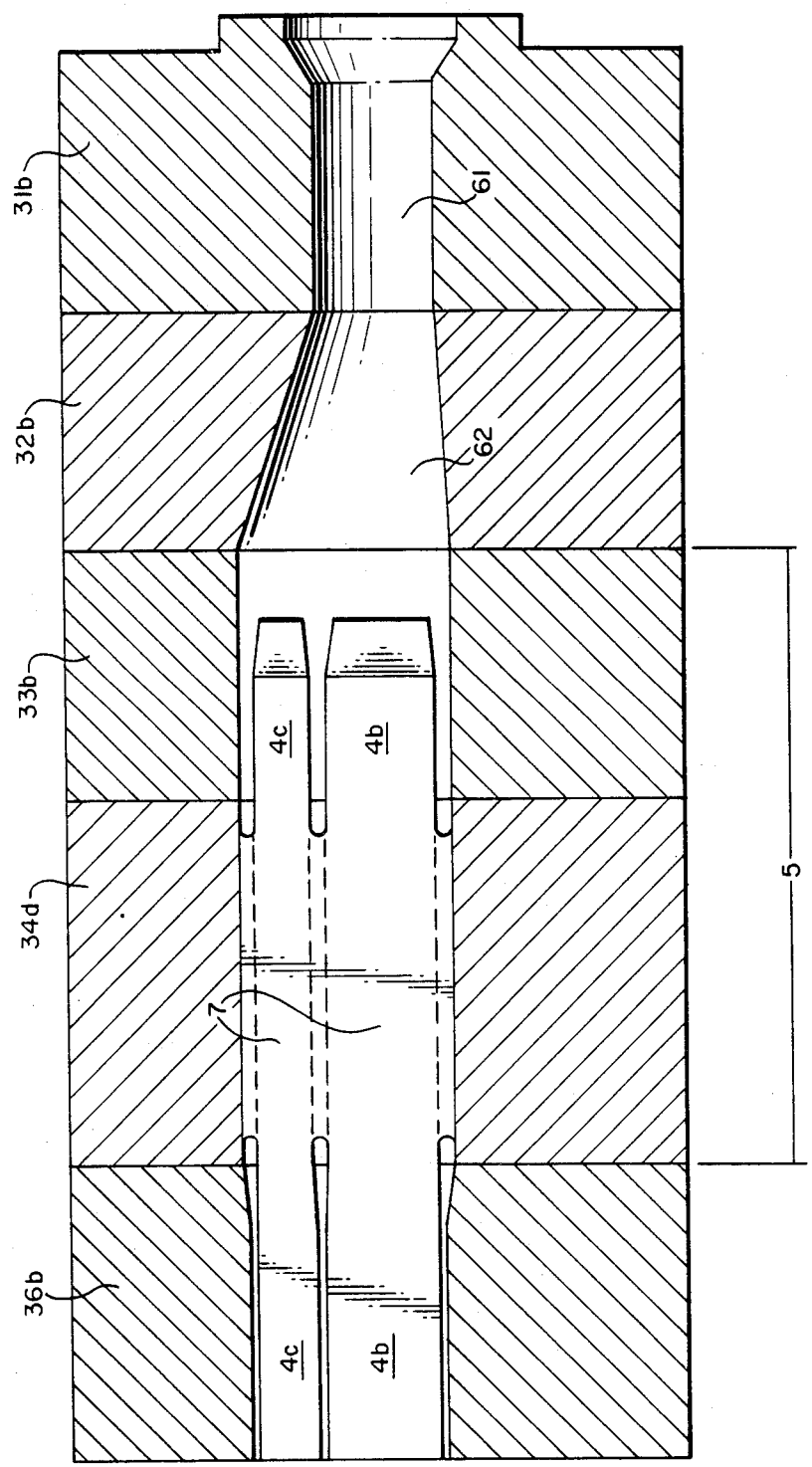

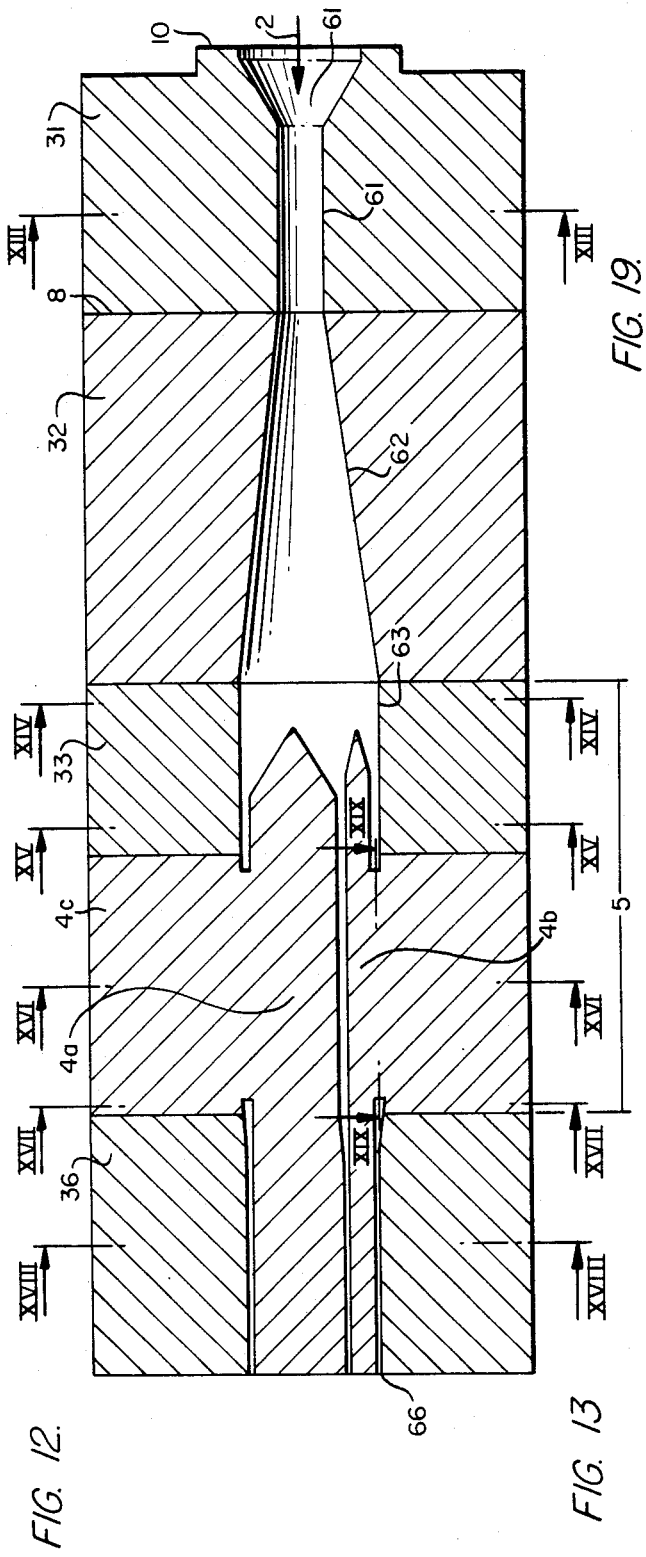

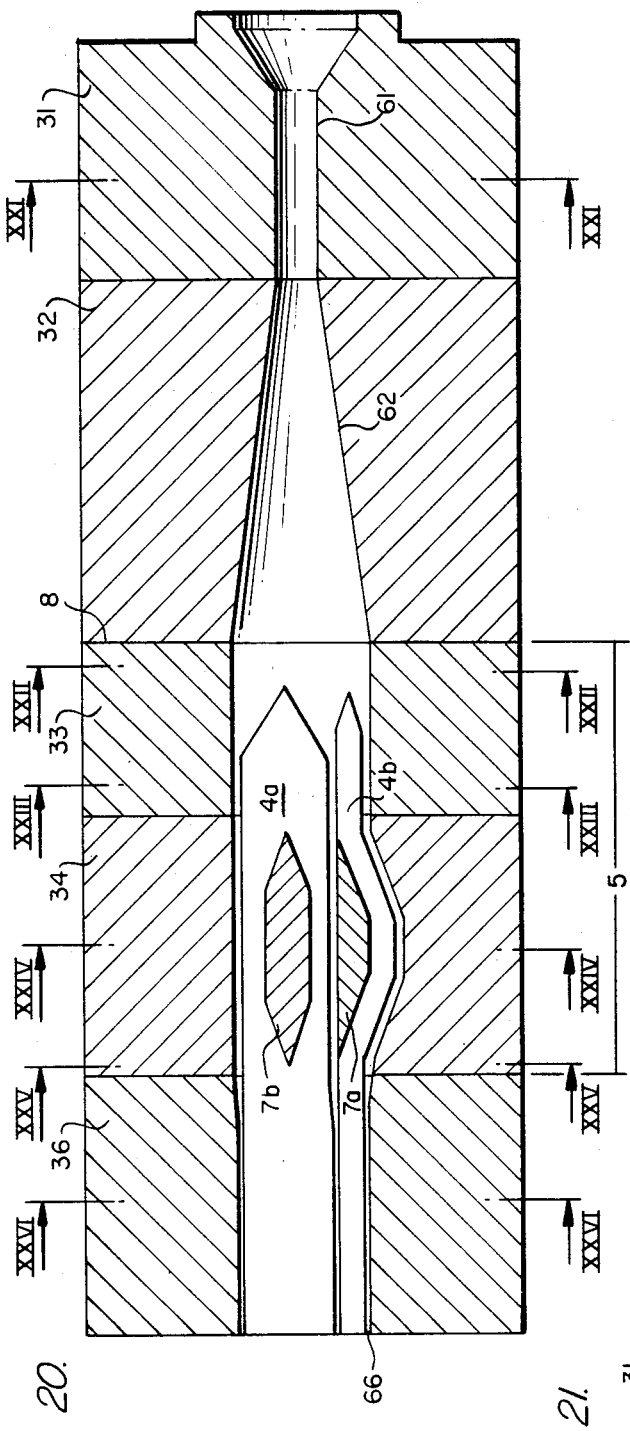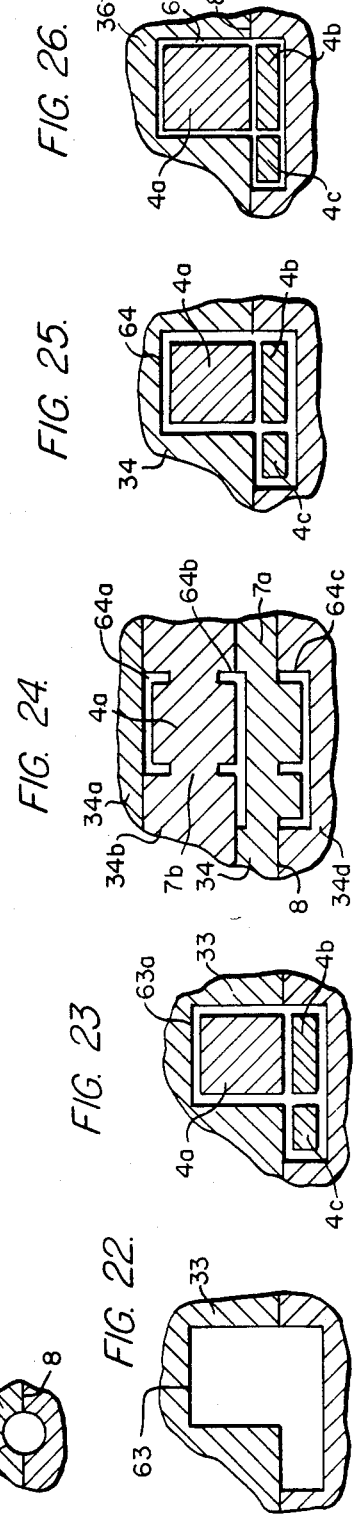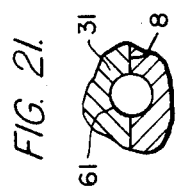

DIE FOR EXTRUDER

This invention relates to a die for extruders with an inwrought flow channel having displacement cores for shaping a plasticized synthetic resin bulk stream into the desired cross-section of a profile having hollow chambers, wherein the die housing is composed of several die members with vertical and/or horizontal mold joints, and the displacement cores in the flow channel are connected to the die housing by way of core-holding webs and act to separate the flow channel in the zone of the webs in correspondence with the web thickness, thus subdividing the bulk stream into partial streams, the combined cross-section of the partial streams being equal to the cross-section of the undivided bulk stream.

In Kunststoff-Maschinenfuhrer (*Plastics Machines Guide*), edited by Dipl.-Ing. H. Schaab and Dr. Klaus Stoeckhert, Carl Hanser Verlag, Munchen/Wien (1979), pages 54–57 and in other publications, profiled dies are described for the molding of hollow-chamber profiles or articles formed of extruded thermoplastic synthetic resin compositions. In the drawings accompanying FIGS. 1 through 4, a brief illustration of such prior art is set forth. For example, FIG. 1 shows a multi-chambered hollow synthetic resin profile; i.e., shaped structure, in a fragmentary view, which profile is to be molded from a synthetic resin bulk stream, plasticized in an extruder, through a die connected in front of the extruder. The die is shown in a partial schematic view in FIG. 2. The bulk stream 2 coming from the extruder, normally arriving with a solid cylindrical cross-section, is shaped into the desired profile in the die. For reasons of manufacturing technique, inter alia, the die is composed of several die parts or members to provide the frequently complicated profile cross-section, which profile is provided with hollow chambers and is, in part, undercut. The bulk stream 2 is shaped into the hollow rod by way of displacement mandrels 4. The cross-section of FIG. 3 illustrates the change in the flow channel. The die is composed of die members or elements 31 through 36; member 31 having internal surfaces still exhibiting a cylindrical cross-section corresponding to the shape of bulk stream; and members 32, 33 change into a conical taper and simultaneously a broadened portion in correspondence with the desired profile shape. The housing member 34 is utilized as the mandrel or core holder housing, and the adjacent housing members 35 and 36 serve to provide the die outlet and final profile molding. In this connection, the housing member 36 is also denoted as a profile nozzle. The displacement cores 4 are arranged in the flow channel of the bulk stream 2 and exhibit a displacement tip 42 of an advantageous configuration from the viewpoint of flow technology. FIG. 4 shows a longitudinal section in plan view of the die of FIGS. 3 and 2, respectively. In this figure, the core-holding webs 41 can clearly be perceived which connect the displacement cores 4 with the die member 34 and, thus, take care of an accurate position of the displacement cores in the die.

In extrusion dies for processing viscoelastic synthetic resin melts; e.g., PVC melts without plasticizer, the flow channel in the die must be adapted very carefully to the desired, frequently rather complicated, contour of the profile cross-section. The configuration of the flow channel also exerts substantial effects on the stress characteristic and the flow behavior of the synthetic resin melt. The homogeneously molten melt, plasticized by the extruder, is conveyed as a bulk stream 2, coming from the extruder, into a circular throttle duct and passes, via the transition of a region which, in most cases has a conical profile, into the so-called "preform zone" of the die where the displacement cores start. (See, for example, FIGS. 2–4.) The outer contour of this preform zone is already adapted to the desired outer contour of the finished profile in the illustrated examples and, as generally customary, this outer contour extends in parallel from the preform zone; i.e., from the die zone 34, to the profile nozzle zone 36 and the outlet of the die for the profile. By the displacement cores, the hollow profile is molded in the preform zone from the solid profile of the bulk stream 2. In the profile nozzle region, the melt is shaped into the final configuration merely somewhat more precisely, and leaves the die as a profiled melt rod-like structure, the final shape of which is obtained after release of the elastic stresses by removing the external pressure.

A very great problem in such dies resides in that, in the preform zone due to the necessary mounting of the displacement cores at the die housing, the shaping operation can be performed only partially as desired, and as a consequence, the stress condition of the melt is adversely affected by the core mounting. The core-holding webs, acting as areas constricting the flow channel and as melt displacement elements in the flow channel, impart to the bulk stream an unfavorable stress condition, whereby the flow guidelines no longer run in parallel but rather transverse flow is created, and as a consequence, the profile structure exiting from the die can be very strongly distorted. This stress condition and/or this distortion can be compensated for only partially in the profile nozzle zone. Additionally, in case of thin-walled profiles, markings are produced on the outside due to bulk stream displacement in the region of the core-holding webs, so-called flow lines, which are undesirable.

The invention is based on the object of improving dies for the processing of viscoelastic synthetic resin melts for the shaping of hollow-chamber profiles to their desired configurations so that the occurrence of additional stresses by the shaping of the flow channel in the die is avoided or reduced, and constrictions of the flow channel by the core mounting means are eliminated.

The invention attains this object for a die of the aforedescribed type by providing that the bulk stream shaped into the general cross-section of the profile by the displacement cores is subdivided into partial streams upstream of the zone of the core-holding webs, the sum of cross-sections of the combined partial streams being equal to the cross-section of the undivided bulk stream, and that the displacement cores, in the zone of the core-holding webs, are enlarged by the thickness of the core-holding webs so that the partial streams are conducted, with the flow cross-sections remaining the same, laterally along the core-holding webs over the displacement core enlargements or protuberances.

The invention practically eliminates the obstacle of the core-holding webs in the flow channel, in that the bulk stream coming from the extruder is preformed in the preform zone by the displacement cores projecting freely into the bulk stream to the desired profile cross-section, and then this profile cross-section is separated and the partial streams are rerouted over sloped protuberances or extensions attached to the displacement cores and corresponding in size to the separation of the flow channel by the webs, this rerouting being done in an advantageous way from the viewpoint of flow dynamics. In this manner, the size and molded configuration of the profile cross-section remains preserved, and there is no interruption or constriction of the bulk stream in the flow channel. Thus, no additional stresses and distortions are introduced into the bulk stream either. After flowing around the core-holding webs, the partial streams are recombined into the same profile as prior to division, and the melt fuses homogeneously along the joints and flows uniformly to the outlet defined by a profile nozzle and to the subsequent final shaping. By means of the invention, the critical zone of the core mounting in the preforming zone of the profile cross-section, shaped from the bulk stream, has been dealt with in such a way that there are no longer any adverse abrupt displacements of material or restrictions of cross-sections. By allowing the divided bulk streams to flow or be conveyed around the core-holding zones, a uniform, parallel flow characteristic is achieved, and the additional occurrence of stresses and distortions is avoided. Only the flow paths become somewhat longer in the region of the detour. If the same flow velocities are to be obtained here, an appropriate resistance must be installed in the flow path in order to keep the flow velocity constant.

It is proposed for a favorable structuring of the die for performing the invention that the die housing be, likewise, subdivided on both sides of the core-holding webs. This makes it possible to fashion or work-in the flow channel in a simple way also in the detour zone, along the lines of this invention.

The configuration of a die, according to this invention, can be utilized with special advantage for multi-chambered hollow profiles. Depending on the shape and design of the hollow profile, it is also possible, for example, to combine the conventional type of arrangement for core-holding members for the displacement cores with the rerouted flow channel configuration in partial zones as provided by the present invention.

The invention will be explained, in greater detail, hereinafter with reference to the embodiments shown in the accompanying drawings wherein:

FIG. 5 shows a schematic vertical longitudinal section through a die constructed according to this invention;

Figure 1:
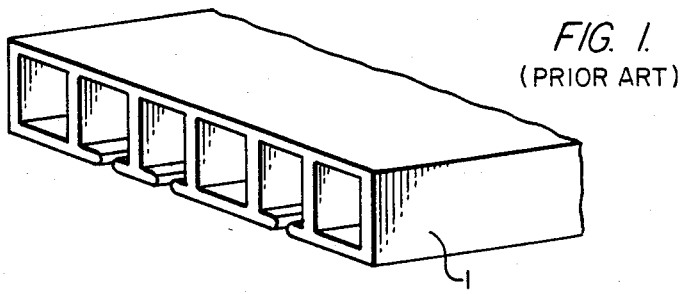
FIG. 1 shows a multi-chambered synthetic resin prior art profile in a partial perspective view.
Figure 2:
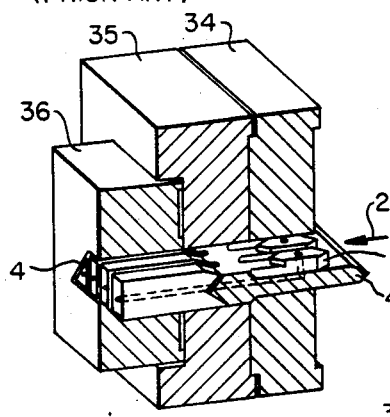
FIG. 2 is a perspective fragmentary view of a prior art die for forming a profile according to FIG. 1.
Figure 3:
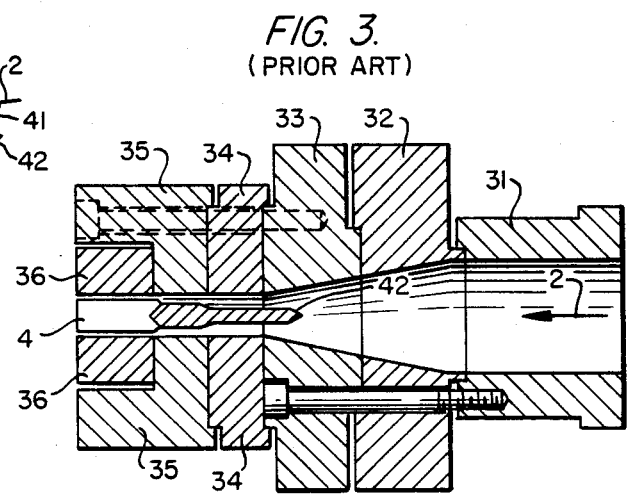
FIGS. 3 and 4 show a vertical cross-section and a horizontal cross-section, respectively, through the prior art die of FIG. 2.
Figure 4:
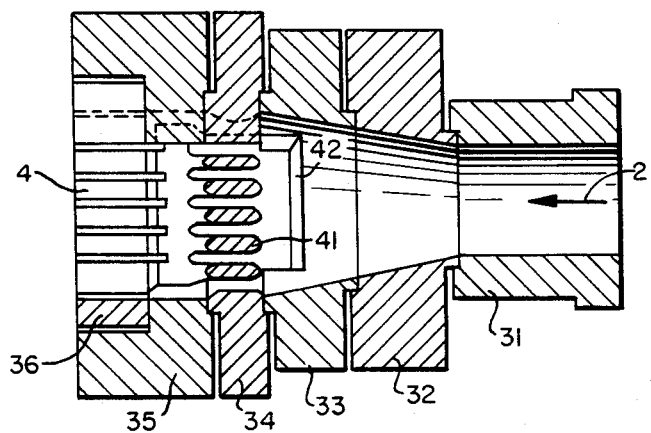
Figure 6:
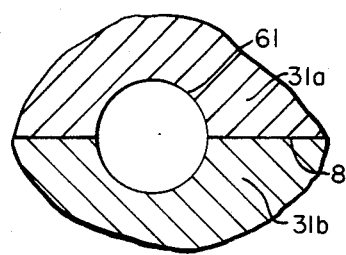
Figure 7:
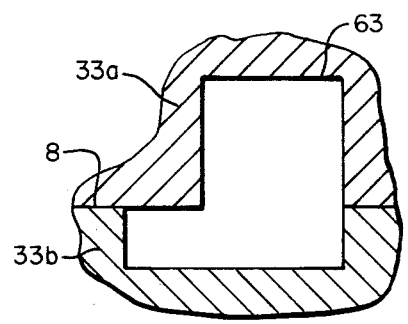

FIG. 5a horizontal section along lines N-O of FIG. 5

FIGS. 6-11, respectively, are vertical cross-sections taken along lines A-B, C-D, E-F, G-H, J-K and L-M through the die of FIG. 5;

FIG. 12 is a schematic vertical longitudinal section through a profile die of conventional construction for producing the same profile cross-section according to FIG. 5;

FIGS. 13-19, respectively, show vertical cross-sections taken along lines A-B, C-D, E-F, G-H, J-K and L-M and a horizontal partial cross-section taken along line N-O through the die of FIG. 12;

FIG. 20 is a schematic vertical longitudinal section through a die construction similar to that shown in FIG. 5 having some features shown in FIG. 12;

FIGS. 21 to 26 are vertical cross-sections taken along lines A-B, C-D, E-F, G-H, J-K, and L-M through the die of FIG. 20.

FIG. 12 shows, in longitudinal section, a die to be used for shaping a profile according to the cross-section shown in FIG. 18 from a thermoplastic synthetic resin composition melted in an extruder (not shown). The die of FIG. 12 is flanged to the extruder at the end face 10, the bulk stream 2 from the extruder existing into the die. While passing through the die, the initially circular flow cross-section 61 in the inlet zone in die part 31 (see the cross-section shown in FIG. 13), is converted into the desired profile cross-section 66 obtained in the outlet zone in the profile nozzle 36 shown in FIG. 18. To form the hollow chambers of the profile, it is necessary for the bulk stream 2 to be divided and distributed by means of displacement cores (i.e., mandrels) of an appropriate shape, installed in the flow channel. These displacement cores, however, must be attached at least at one location to the die member constituting the housing, or must be connected thereto by mounting means, since, after all, these cores cannot swim freely in the bulk stream. The bulk stream coming from the extruder is normally conveyed via a circular throttle duct defining a passage having cross-section 61 (see FIG. 13) into a conically flaring zone 62 of the flow channel which, at the left-hand end, already exhibits the external dimensions of the desired profile cross-section. Thereafter, the bulk stream passes into the so-called preform zone 5 wherein the displacement cores are suspended; i.e., positioned within the channel containing the bulk stream. First of all, the bulk stream is rerouted by the free tips of the displacement cores 4a, 5b into the desired profile shape, see FIG. 15. This zone is followed by the zone wherein the displacement cores 4a, 4b are connected at least in a lateral region, respectively, with the die housing part 34 (see cross-section N-O illustrated in FIG. 19, which is effected by the webs 7b). In this zone of the webs 7b, the flow channel is narrowed; i.e., the bulk stream is interrupted.

The section E-F, according to FIG. 16, clearly shows the constricted locations 7a, 7b, 7c at which the displacement cores 4a, 4b, 4c are joined to the die housing members. In the outlet zones, the displacement cores 4a, 4b 4c are then arranged again freely in the flow channel; this holds true, in particular, for the region of the profile nozzle 36, as shown in FIGS. 17 and 18. In the profile region, the desired precision dimension is imparted to the preformed profile. Due to the constriction in the flow channel in the region of suspension of the displacement cores, shown in FIG. 16, a considerable distortion of the bulk stream occurs, and, thus, additional stresses are created within the bulk stream which later on prove to be deleterious during solidification of the profiles. Moreover, irregularities can arise when recombining the bulk streams after the core mounting, in the zone of section C-D, see FIG. 17, so that these confluent lines will definitely be recognizable later on in the visible surface of the profiles, which is undesirable. The die schematically illustrated in FIGS. 12-19 exhibits vertical and horizontal divisions, to be able to effect a corresponding configuration of the flow channel in the individual regions. The divisions or parting planes are indicated, respectively, by reference numeral 8.

Figure 8:
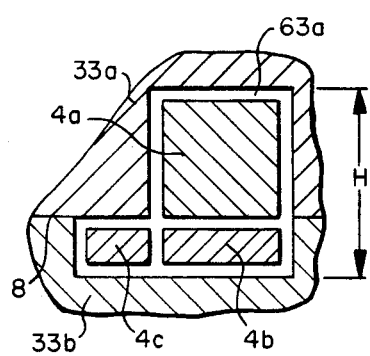
Figure 9:
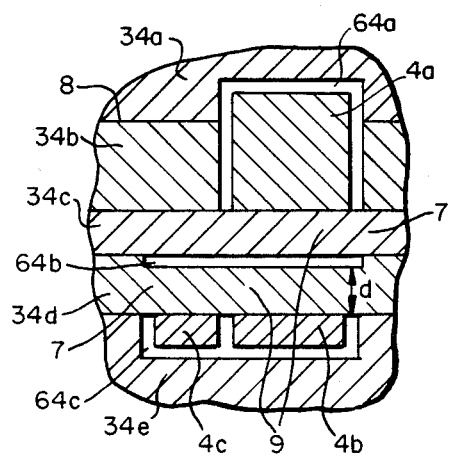
Figure 10:
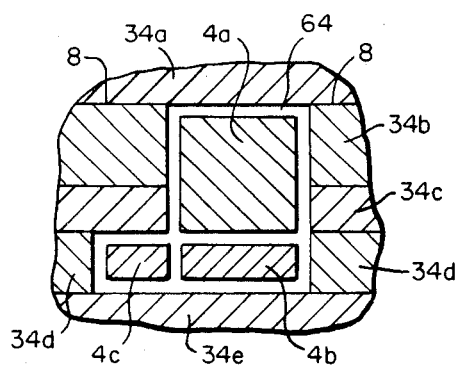
Figure 11:
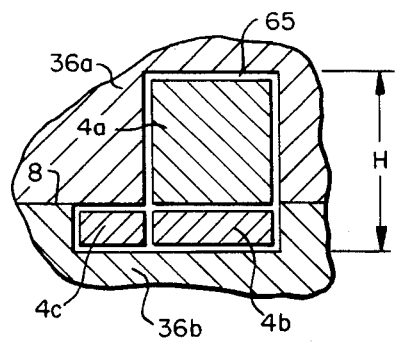

According to the invention, the guidance of the bulk stream in the zone of the core mounting is achieved in a novel way. As can be seen from FIG. 5, with a construction of the die similar to that shown in FIG. 12, the preform zone 5 provided with the displacement cores 4a, 4b and 4c is designed in a novel fashion. The portions wherein the cores 4a, 4b, visible in the illustrated longitudinal section, are laterally joined to the die member 34 by mounting means; namely, the so-called webs, are denoted by reference numeral 7 and shown in oblique shading. In order to avoid narrowing of the flow channel in the region of these webs 7, the displacement cores are enlarged toward the outside in this zone by the thickness d of the webs 7 (see the portions 9). This perforce means a deflection of the flow channel in this zone. Although by such deflection a somewhat longer flow path arises for the bulk stream, there is simultaneously the avoidance of a reduction of the flow cross-section due to the core mounting; i.e., the webs 7. The cross-sectional views shown in FIGS. 6 to 11 illustrate the construction and mode of operation of the invention. The initially circular throttle duct defining a flow passage or channel with a cross-section 61 in FIG. 6 is again widened, in the initial zone, to the external contour of the desired profile (see flow cross-section 63 according to FIG. 7), and then is subdivided in the preform zone in the region of the free tips of the displacement cores to the desired profile shape with several hollow chambers (see FIG. 8). In the region of the suspension of cores 4a, 4b and 4c, the displacement core is then enlarged toward the outside; i.e., toward the die member 34 by the portions 9 defining the webs 7, so that the profile cross-section of the flow channel, according to FIG. 8, is separated laterally by the webs 7 and two of the separated sections are displaced, respectively, upwardly and downwardly by the regions defined by portions 9. Also the die member 34 is provided with a diverted or an enlarged flow channel which allows for displacement of the partial streams away from each other. The resultant partial streams or partial flow cross-sections 64a, 64b and 64c yield, if combined, in turn the flow cross-section 63a of FIG. 8 and also, in turn, after passing through the core-holding zone, the flow cross-section 64 according to FIG. 10. This arrangement, moreover, results in a stress-free flow around the core-holding zone of the displacement cores whereby improved quality and accuracy are achieved, especially in complicated hollow-chamber cross-sections of profiles. The height H of the outer contour is attained as early as in the beginning of the preform zone (see FIG. 8), and still corresponds to that (cross-section 65) in the outlet zone of the profile nozzle 36 (see FIG. 11). The individual die parts 31-36, provided by the vertical subdivision of the die in the flow direction are, moreover, subdivided in horizontal planes depending on the configuration of the profile. The planes of division are all denoted by reference numeral 8. The subdivided die members additionally produced by the horizontal division are additionally marked in each case with small letters a through e.

According to the invention, the profile rod shaped in the preform zone of the die is divided into individual partial streams or partial profiles, and these are conducted over protuberances or outwardly extending lateral portions formed at the displacement cores, these protuberances being oriented at right angles to the flow direction. After flowing over the protuberances, the partial streams are recombined to the original profile cross-section, thus avoiding a reduction in total flow cross-section for this zone.

FIG. 20 shows a die construction which utilizes a combination of core suspension according to the old die construction with restriction of the flow cross-section and of the construction, according to this invention, while retaining the flow cross-section in the zone of the core mounting. The displacement core 4a is connected in the zone of its mounting via webs 7b to the die member 34. In the region where the webs 7b penetrates into the flow channel 64, the channel is narrowed by the web thickness and this arrangement adversely affects the flow of the bulk stream. In the zone of the displacement core 4b, this core is anchored to the die member 34 by means of web 7a, but the displacement core 4b is laterally enlarged by the size of the web 7a, whereby rerouting of the bulk stream is made possible in this zone. Here again, a portion of the die member 34 is provided with an enlarged flow channel to allow for the increased size of the core or mandrel 4a. The rerouting corresponds to the web thickness 7a, so that no diminution of the flow cross-section occurs. Accordingly, there is no impairment of or additional effect on the bulk stream which could lead to stress buildup. FIGS. 21-26 show, in turn, the vertical flow cross-sections at the individual zones of the die. It is quite possible to provide such a combined construction, depending on the configuration of the profile to be formed.

What is claimed is:

1. A die operatively associated with an extruder and provided with an inwrought flow channel which comprises a die housing having internal surfaces defining said flow channel and displacement cores for shaping a plasticized synthetic resin bulk stream into a shaped profile having a cross-section provided with hollow chambers, said die housing comprising several die members joined together to define said flow channel and the displacement cores in the flow channel being connected to at least one member of the die housing by way of core-holding webs that separate the flow channel thus subdividing a profiled bulk stream into partial streams, the combined cross-sections of the partial streams being equal to the cross-section of the undivided profiled bulk stream, at least one of the die members cooperating with the displacement cores so that the bulk stream received from the extruder is shaped into the profiled bulk stream having a cross-section substantially corresponding to said shaped profile, the displacement cores having surfaces that subdivide the profiled bulk stream upstream of the zone of the core-holding webs into said partial streams and the displacement cores being enlarged according to the thickness of the core-holding webs so that the sum of the cross-sections of the partial streams remain the same and are equal to the cross-section of the profiled bulk stream upstream of the core-holding webs and equal to the cross-section of a profiled stream formed from the combined partial streams downstream of the core-holding webs, and said partial streams are conducted along the core-holding webs formed by the enlarged portions of the displacement cores.

2. A die according to claim 1, wherein the die housing is subdivided on both sides of the core-holding webs.

3. A die according to claim 1, wherein the die housing is enlarged in a zone surrounding said core-holding webs.

4. A die for use with an extruder producing a bulk stream of plasticized synthetic resin, said die comprising a die housing having internal surfaces defining a flow channel for the bulk stream and displacement cores positioned in said channel for shaping the bulk stream into a shaped profile having a cross-section with hollow chambers formed therein, said die housing comprising a plurality of die members defining said flow channel, and the displacement cores in the flow channel having web means for connecting said displacement cores to at least one member of the die housing, the web means extending laterally from the displacement cores to subdivide the profiled bulk stream into partial streams which are displaced separately from each other, and the combined cross-sections of the partial streams being equal to the cross-section of the undivided profiled bulk stream; the displacement cores having surfaces that subdivide and separate the profiled bulk stream upstream of the zone of the core-connecting webs into said partial streams so that the sum of the cross-sections of the partial streams remains the same and equal to the cross-section of the profiled bulk stream upstream of the core-connecting webs and equal to the cross-section of a profiled stream formed from the combined partial streams downstream of the core-connecting webs.

5. A die according to claim 4, wherein the displacement cores are enlarged by laterally extending protuberances which form said web means, the thickness of the protuberances corresponding to the extent of the displacement of the partial streams.

6. A die according to claim 4, wherein the at least one die member has internal wall surfaces that define an enlarged flow channel surrounding the web means.

7. A die according to claim 1, wherein the displacement cores and the core-holding webs cooperate with at least one of said die members to ensure that the partial streams remain the same size and the same shape during passage along the core-holding webs.

8. A die according to claim 4, wherein the displacement cores and the core-connecting webs cooperate with at least one of said die members to ensure that the partial streams remain the same size and the same shape during passage along the core-connecting webs.

* * * * *